US011230092B2

(12) United States Patent
Endert

(10) Patent No.: US 11,230,092 B2
(45) Date of Patent: Jan. 25, 2022

(54) SYSTEM AND METHODS FOR REGISTRATION ALIGNMENT ACCURACY IN MANUFACTURE OF DECORATIVE LAMINATES

(71) Applicant: KINGS MOUNTAIN INTERNATIONAL, INC., Kings Mountain, NC (US)

(72) Inventor: Martin Endert, Spartanburg, SC (US)

(73) Assignee: KINGS MOUNTAIN INTERNATIONAL, INC., Kings Mountain, NC (US)

( * ) Notice: Subject to any disclaimer, the term of this patent is extended or adjusted under 35 U.S.C. 154(b) by 0 days.

(21) Appl. No.: 16/815,508

(22) Filed: Mar. 11, 2020

(65) Prior Publication Data
US 2020/0290338 A1 Sep. 17, 2020

Related U.S. Application Data

(60) Provisional application No. 62/816,652, filed on Mar. 11, 2019.

(51) Int. Cl.
*B32B 41/00* (2006.01)
*B32B 37/10* (2006.01)

(52) U.S. Cl.
CPC .............. *B32B 41/00* (2013.01); *B32B 37/10* (2013.01); *B32B 2041/04* (2013.01); *B32B 2309/72* (2013.01)

(58) Field of Classification Search
CPC ......... B32B 37/10; B32B 38/18; B32B 41/00; B32B 2041/04; B32B 2309/72;
(Continued)

(56) References Cited

U.S. PATENT DOCUMENTS

2012/0303335 A1\* 11/2012 Endert .................... G06F 30/20
703/1
2014/0023265 A1 1/2014 Kitazawa et al.
2016/0311247 A1\* 10/2016 Ochoa .................. B44C 5/0469

FOREIGN PATENT DOCUMENTS

DE 102005020456 A1 11/2006

OTHER PUBLICATIONS

Google Machine Translation of DE102005020456B4, Inventor Götz Sondermann, publication date Dec. 4, 2008 (Year: 2008).*

(Continued)

*Primary Examiner* — George R Koch
(74) *Attorney, Agent, or Firm* — Moore & Van Allen PLLC; W. Kevin Ransom

(57) ABSTRACT

A system for maintaining alignment of a press plate is provided. The system comprises: a press including a press plate, the press configured for forming a laminate comprising a decorative layer and a substrate; a camera; and a processing device configured to: retrieve a laminate design file comprising a decorative design drawing layer and a texture design drawing layer, the laminate design file illustrating the decorative design drawing layer overlaid with the texture design drawing layer; following manufacture of the laminate with the press, capture an image of the laminate with the camera; compare a portion of the captured image of the laminate to a corresponding portion of the laminate design file to determine a registration quality; based on the determined registration quality, determine a misalignment of the decorative layer with the press plate; and in response to determining the misalignment, trigger an alert.

20 Claims, 6 Drawing Sheets

(58) Field of Classification Search
CPC .... B44B 5/02; B44C 1/24; B44C 5/04; G06T 7/00; G01N 21/898
See application file for complete search history.

(56) References Cited

OTHER PUBLICATIONS

Kings Mountain International, Inc., International Application No. PCT/US2020/022017, International Search Report and Written Opinion, dated Jul. 6, 2020.

Anonymous, "Percentage difference between images—Rosetta Code", Mar. 21, 2020, https://rosettacode.org/wiki/Percentage_difference_between_images.

Kings Mountain International, Inc., International Patent Application No. PCT/US2020/022017, International Preliminary Report on Patentability, dated Sep. 23, 2021.

* cited by examiner

SYSTEM AND METHODS FOR REGISTRATION ALIGNMENT ACCURACY IN MANUFACTURE OF DECORATIVE LAMINATES

CROSS-REFERENCE TO RELATED APPLICATIONS

This application is a non-provisional filing of U.S. Provisional Patent Application No. 62/816,652, filed Mar. 11, 2019, the contents of which are hereby incorporated by reference herein.

FIELD OF THE INVENTION

The invention generally relates to the field of textured decorative laminates, and more particularly, embodiments of the present invention relate to systems and methods for alignment of a decorative layer with a press plate during manufacture of a decorative laminate.

BACKGROUND OF THE INVENTION

Decorative laminates have been used as surfacing material for many years, in both commercial and residential applications. Decorative laminates can provide an aesthetically pleasing surface that is more economical and/or has improved physical characteristics compared to similar looking alternatives. For example, decorative laminates can be used to create flooring that has the appearance of real hardwood flooring but is less expensive and more durable than real hardwood flooring.

In addition to flooring, decorative laminates are often used in furniture, countertops, cabinets, wall paneling, partitions, fixtures, and the like. As described above, decorative laminates can be made to resemble real wood. Decorative laminates can also be made to resemble such other materials and surfaces as stone, ceramic, marble, concrete, leather, fabric, brick, tile, and the like. In other applications, instead of being made to resemble a particular traditional material or surface, a decorative laminate may be made to provide more fanciful surfaces.

More recently, decorative laminates have been improved to include a three-dimensional "textured" surface. In this way, decorative laminates can be made to not only look like some other material or surface, but can also can be made to feel like the other material or surface. In fact, decorative laminates can be made to so closely resemble the look and feel of other materials that one cannot easily determine whether the surface includes the real materials or is a faux representation of the real materials. For example, a textured decorative laminate made to look like real wood paneling may include a plurality of depressions and/or protrusions on its surface to create a texture that simulates the grains and knots of real wood boards. In another example, the textured decorative laminate may be made to look like a plurality of ceramic tiles separated by grout lines. In such an embodiment, the surface of the laminate may be made so that the images of the grout lines are depressed relative to the images of the ceramic tiles. In still other applications, textured decorative laminates may be made with more fanciful visual artwork and may have embossing and textures that work in conjunction with the visual artwork to create a more interesting and aesthetically pleasing surface.

In general, decorative laminates are classified into two broad categories based on how the laminates are manufactured, namely "high" pressure decorative laminates (HPDLs) and "low" pressure decorative laminates (LPDLs). In general, the industry considers "high" pressure decorative laminates as those laminates that are manufactured or "laminated" under a pressure of generally more than 750 psig. "Low" pressure decorative laminates are typically manufactured at a pressure of about 300 to 600 psig.

HPDLs and LPDLs are often further distinguished by the fact that HPDLs are typically manufactured by first laminating a decorative paper layer with one or more other thin layers and a resin to create a relatively thin and flexible laminate. This thin and flexible laminate is then typically adhered to a thicker, self-supporting substrate layer during a later stage of manufacturing. In contrast, LPDLs are typically manufactured by laminating the decorative paper layer with the self-supporting substrate layer, such as particleboard or MDF, and a resin in a single laminating or "pressing" operation during its manufacture. Generally, the idea is that the higher pressures involved in manufacturing HPDLs may "crush" the substrate layer. For this reason, LPDLs are sometimes also referred to as "direct" pressure decorative laminates (DPDLs) since the decorative layer is laminated or "pressed" directly onto the core layer in a single step. However, it should be noted that, although manufacturing HPDLs typically involves the two steps described above while manufacturing LPDLs typically involves the one step described above, this is merely a generalization about the typical manufacturing processes used to make the two different types of laminates. In some procedures, an HPDL may be laminated with a self-supporting substrate layer in a single pressing step and a LPDL may be adhered to a substrate layer in more than one step.

FIG. 1 illustrates an exemplary LPDL 5 and press system 1, such as one that may be used in accordance with embodiments of the present invention. As illustrated in FIG. 1, the laminate 5 generally comprises a decorative layer 6 and a substrate layer 8. The decorative layer 6 is typically a sheet of paper or similar material having a decorative image or pattern printed thereon. The substrate layer 8 is used to provide structure to the laminate and may be, for example, particleboard, high-density fiberboard (HDF), medium-density fiberboard (MDF), or the like. The decorative layer 6 is soaked with resin, such as a melamine formaldehyde resin, and is bonded to the substrate layer 8. In some embodiments, one or more other layers are bonded with the decorative layer 6 and the substrate layer 8. For example, a substantially transparent wear resistant layer 12 may be bonded over top of the decorative layer 6 to protect the "top" surface of the final laminate. Likewise, a base layer 10 may be bonded to the lower surface of the substrate to protect the "bottom" surface of the final laminate.

As illustrated in FIG. 1, these layers are at least partially coated or saturated with resin and placed in a press 2 where they are bonded together under heat and pressure. For example, the layers are typically heated to approximately to 220 degrees Celsius and pressed together at approximately 300 to 400 psi for approximately 15 to 20 seconds. The heat cures the thermosetting resin, thereby bonding the layers together. For textured decorative laminates, the upper portion of the press 2 typically has a press plate 4 attached thereto, where the press plate 4 has a plurality of depressions and/or protrusions arranged in a three-dimensional design. When the press plate 4 is pressed into the resin and against the upper surface of the laminate, the resin on the upper surface cures with an imprint of the three-dimensional surface of the press plate therein. The press 2 may also include a lower press plate 3 attached thereto. The lower press plate 3 may have a flat, smooth surface or, in some embodiments, may have a plurality of depressions and/or protrusions arranged in a three-dimensional design so that the lower surface of the laminate is embossed in addition to or as an alternative to the upper surface of the laminate.

Importantly, the textured press plate 4 must be aligned precisely with the decorative layer 6 so that the texture design pressed into the laminate is properly aligned with the decorative image or pattern on the decorative layer 6. If the press plate 4 is even slightly out of register with the decorative layer 6, the resulting laminate may have to be discarded. For example, if the texture pattern is slightly shifted or angled relative to the decorative pattern, a moiré effect can be created resulting in a significantly blurred image or the appearance of undesirable patterns in the laminate. In another example, a feature of the texture design is obviously misaligned with some corresponding feature of the decorative image. For instance, where the decorative image is of a tiled surface, a ridge that is intended to be aligned with the edge of a tile in the decorative image may instead fall in the grout line area or the tile area of the decorative image.

The registration of the press plate and the decorative layer is further complicated by the fact that the metallic press plate expands when heated during the laminating process and the fact that the decorative layer and the substrate layer may also expand based on the specific material properties of each layer. Furthermore, each press may uniquely affect how a press plate will grow based on how the particular press fixes the press plate to the press, e.g., based on the position and spacing of lugs and/or clamps used to secure the press plate to the press.

A system for generating HPDLs may, in some cases, be similar to the LPDL system shown in FIG. 1. The pressures, and often temperatures, however, will generally be significantly higher in an HPDL system. Although the layering in an HPDL may be different, the manufacture of textured HPDLs still generally involves use of a press, a textured press plate, a decorative layer, and a thermosetting polymeric resin.

Typically, the party that manufactures the laminate has another party create the textured press plate(s) used in the manufacturing process. Since the press plates must be able to withstand significant and repetitive heat and pressure changes and since the press plates must typically have very detailed and precise texture patterns formed of many minuscule depressions and/or ridges in the press plate, the manufacturer of the press plate is typically a company that specializes in the manufacture of precision metal plates. Although the laminate maker, and perhaps the end user of the laminate, generally decide on what will be a suitable texture for the resulting laminate, the press plate manufacturer is also usually involved in the design of the texture since the press plate company typically has significant knowledge of which textures are possible and at what cost different textures can be made. As such, the laminate designer typically must work closely with the press plate manufacturer in order to obtain the desired look and feel of the finished laminate and to determine allowable tolerances in the registration of the press plate and the decorative layer.

Since the process is usually an iterative one, there needs to be fast and economical ways for the different parties to communicate ideas to one another and to determine how the finished product will appear without having to make full scale press plates and laminates each time a change is made, or another idea is tried during the design process. There also needs to be systems and methods to efficiently and accurately ensure press plate and laminate alignment while maintaining potentially proprietary design data security.

BRIEF SUMMARY OF THE INVENTION

A system for maintaining alignment of a press plate is provided. The system comprises: a press including a press plate, the press configured for forming a laminate comprising a decorative layer and a substrate; a camera; and a processing device configured to execute computer-readable program code stored on a memory to: retrieve a laminate design file comprising a decorative design drawing layer and a texture design drawing layer, the laminate design file illustrating the decorative design drawing layer overlaid with the texture design drawing layer; following manufacture of the laminate with the press, capture an image of the laminate with the camera; compare a portion of the captured image of the laminate to a corresponding portion of the laminate design file to determine a registration quality; based on the determined registration quality, determine a misalignment of the decorative layer with the press plate; and in response to determining the misalignment, trigger an alert.

In one specific embodiment, the processing device is configured to retrieve only the corresponding portion of the laminate design file for comparison to the captured image, wherein a remaining portion of the laminate design file is not retrieved.

In another embodiment, the processing device is further configured to compare a predetermined number of captured image segments from the captured image of the laminate to corresponding segments of the laminate design file. In yet another embodiment, the predetermined number of captured image segments correspond to one or more points, measurements, pixels, or pixel locations of the laminate design file. In yet another embodiment, the processing device is further configured to increase a number of compared image segments in response to determining the misalignment.

In yet another embodiment, the processing device is further configured to compare the captured image of the laminate to the laminate design file on a pixel-by-pixel basis.

In yet another embodiment, comparing the portion of the captured image of the laminate to the corresponding portion of the laminate design file further comprises overlaying the captured image of the laminate with the laminate design file. In yet another embodiment, the processing device is further configured to compensate for an optical distortion associated with the captured image by applying at least one of an offset, a weighting, or a filter to the captured image.

In yet another embodiment, the decorative design drawing layer defines one or more colorations, hues, visual patterns, or images of the decorative layer. In yet another embodiment, the texture design drawing layer defines one or more recesses and protrusions in a surface of the decorative layer.

In yet another embodiment, the registration quality is a percent match between the captured image of the laminate and the laminate design file. In yet another embodiment, the processing device is further configured to determine the misalignment of the decorative layer with the press plate further based on the registration quality being below a minimum threshold registration quality value. In yet another embodiment, the processing device is further configured to continue manufacturing with the press plate based on the registration quality being equal to or greater than the minimum threshold registration quality value. In yet another embodiment, the processing device is further configured to discard the laminate based on the registration quality being below the minimum threshold registration quality value.

A method for maintaining alignment of a press plate is also provided. The method comprises: providing a press including a press plate, the press configured for forming a laminate comprising a decorative layer and a substrate; retrieving a laminate design file comprising a decorative design drawing layer and a texture design drawing layer, the laminate design file illustrating the decorative design drawing layer overlaid with the texture design drawing layer; following manufacture of the laminate with the press, capturing an image of the laminate with a camera; comparing a portion of the captured image of the laminate to a corresponding portion of the laminate design file to determine a registration quality; based on the determined registration quality, determining a misalignment of the decorative layer with the press plate; and in response to determining the misalignment, triggering an alert.

In one specific embodiment, retrieving the laminate design file further comprises retrieving only the corresponding portion of the laminate design file for comparison to the captured image, wherein a remaining portion of the laminate design file is not retrieved.

In another embodiment, comparing the portion of the captured image of the laminate to the corresponding portion of the laminate design file comprises comparing a predetermined number of captured image segments from the captured image of the laminate to corresponding segments of the laminate design file.

A computer program product for maintaining alignment of a press plate is also provided. The computer program product comprises a non-transitory computer-readable medium comprising computer-readable instructions, the computer-readable instructions, when executed by a processing device, cause the processing device to: retrieve a laminate design file associated with a laminate, the laminate design file comprising a decorative design drawing layer and a texture design drawing layer, the laminate design file illustrating the decorative design drawing layer overlaid with the texture design drawing layer; following manufacture of the laminate with the press, capture an image of the laminate with a camera; compare a portion of the captured image of the laminate to a corresponding portion of the laminate design file to determine a registration quality; based on the determined registration quality, determine a misalignment of the decorative layer with the press plate; and in response to determining the misalignment, trigger an alert.

In one specific embodiment, the computer-readable instructions are further configured to cause the processing device to retrieve only the corresponding portion of the laminate design file for comparison to the captured image, wherein a remaining portion of the laminate design file is not retrieved.

In another embodiment, the processing device is associated with a first system, and the laminate design file is stored in a second system in communication with the first system over a network, and wherein the computer-readable instructions are further configured to cause the processing device to retrieve at least the corresponding portion of the laminate design file from the second system for comparison to the portion of the captured image.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
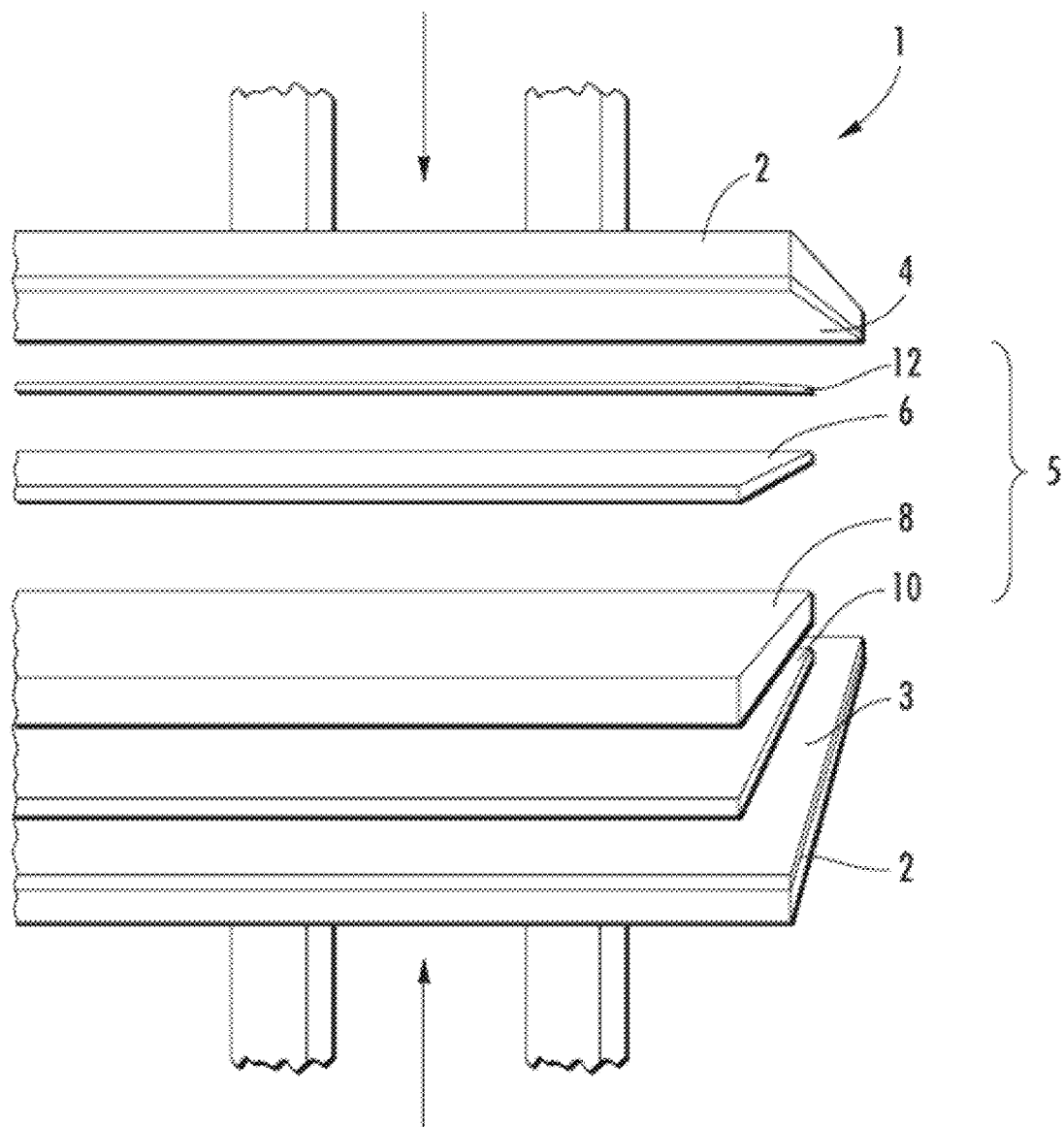
Figure 2:
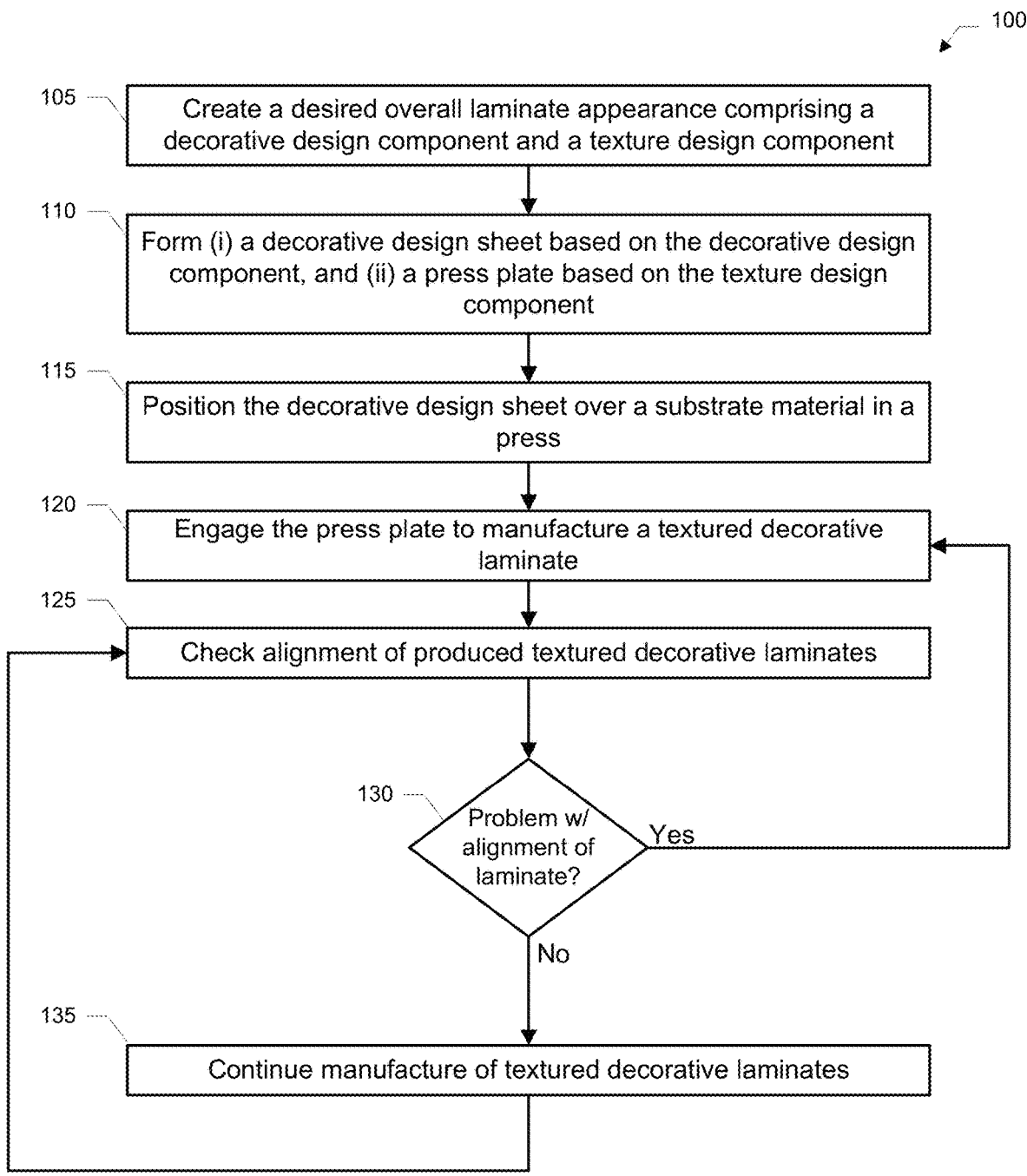
Figure 3:
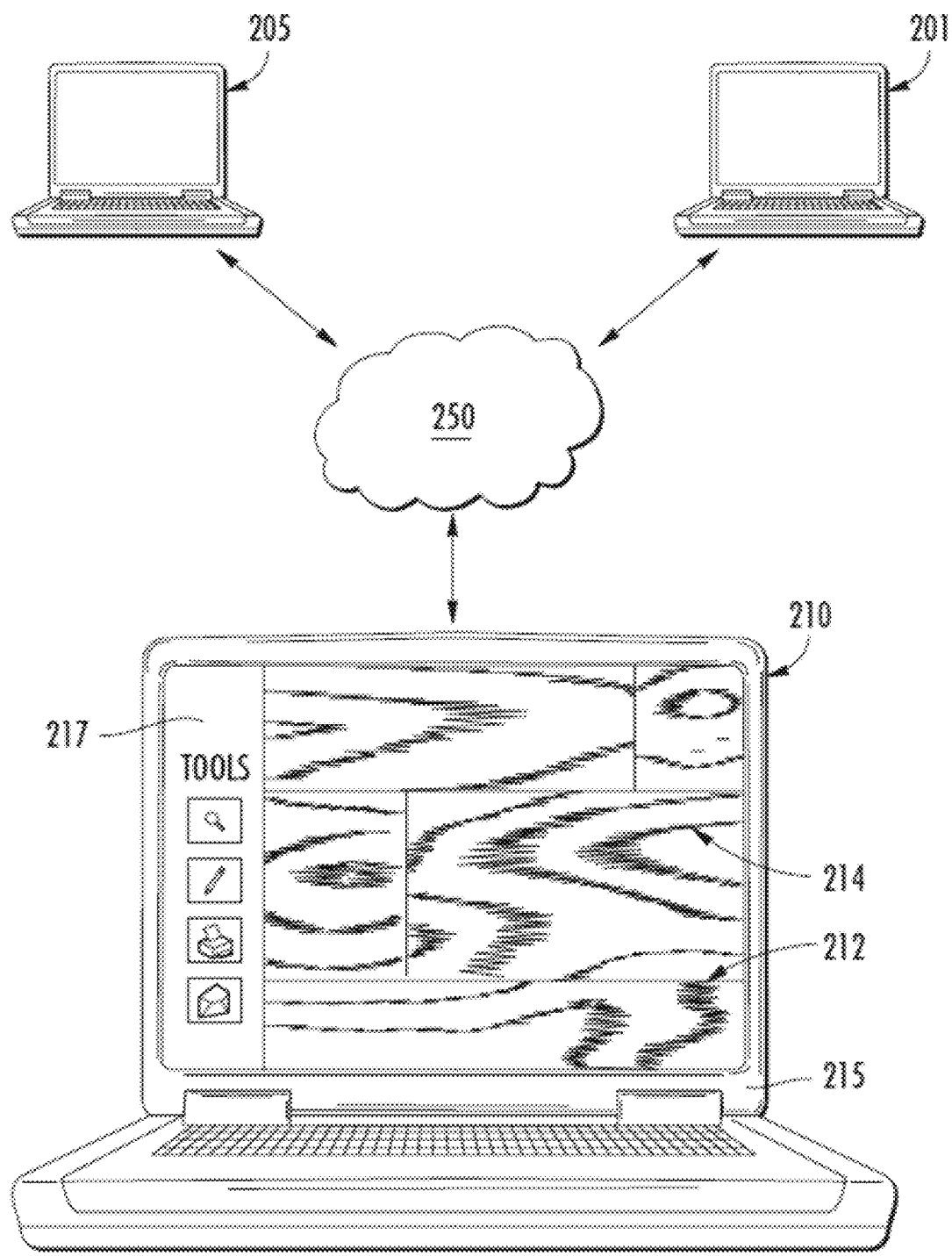
Figure 4:
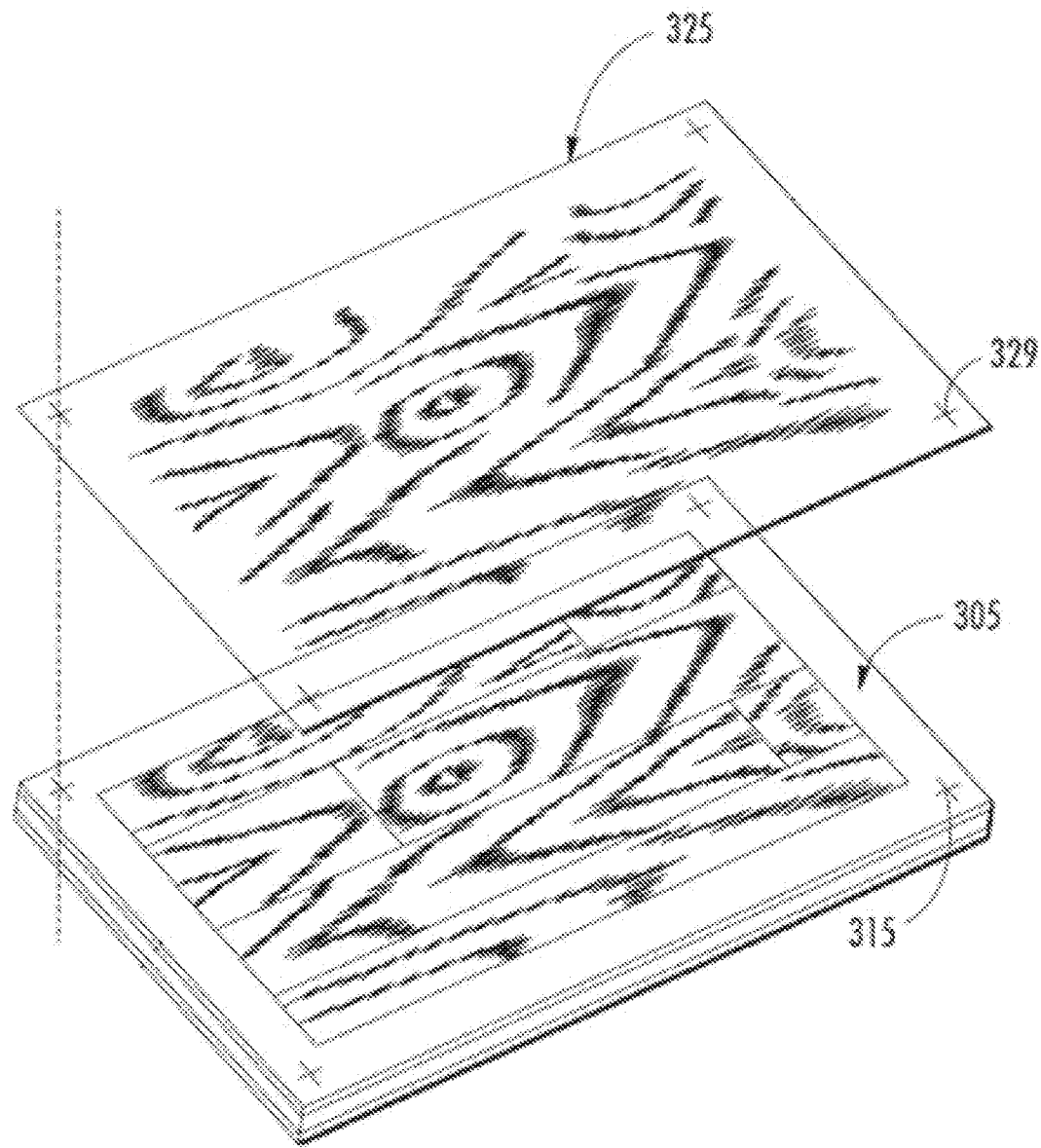
Figure 5:
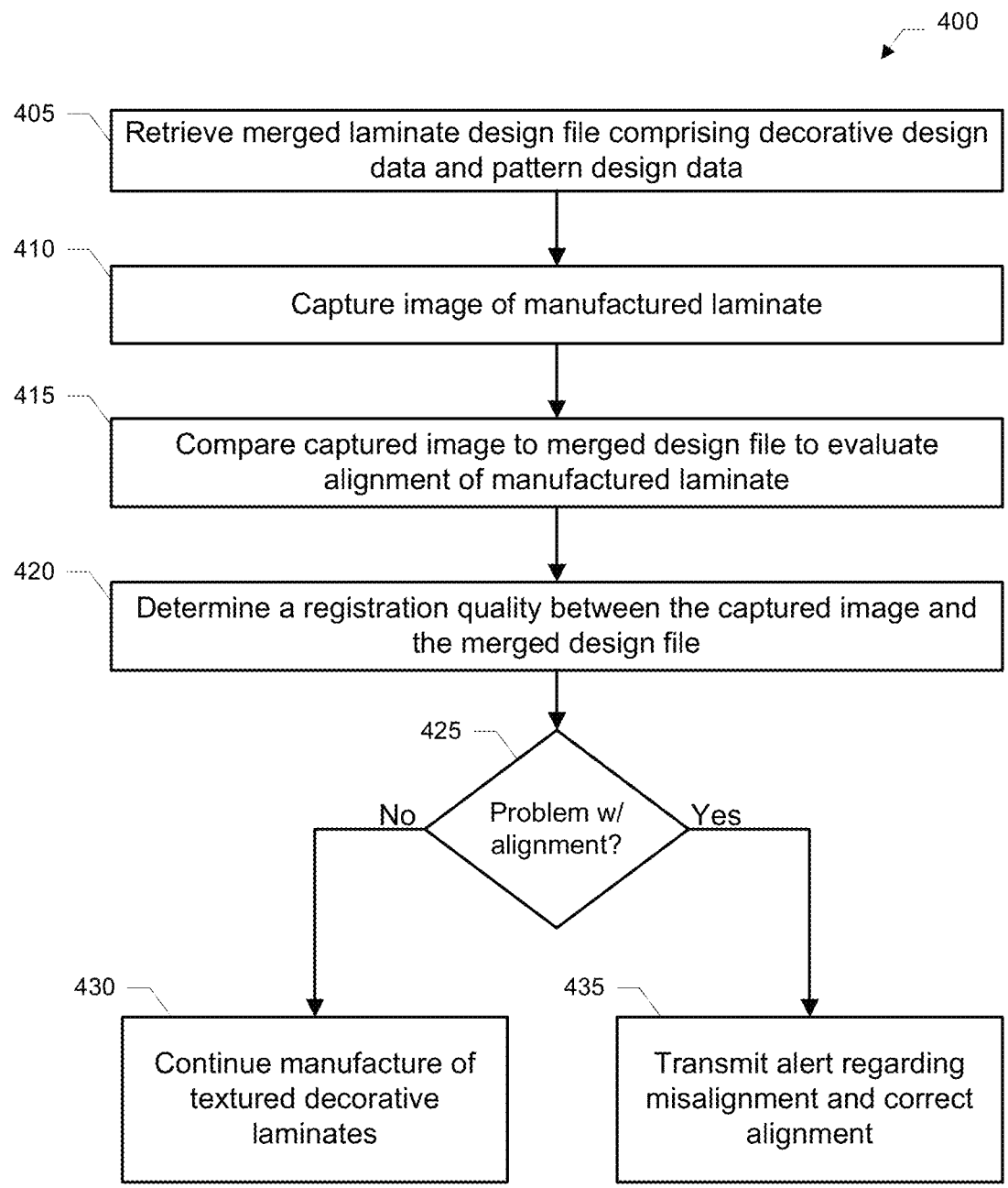
Figure 6:
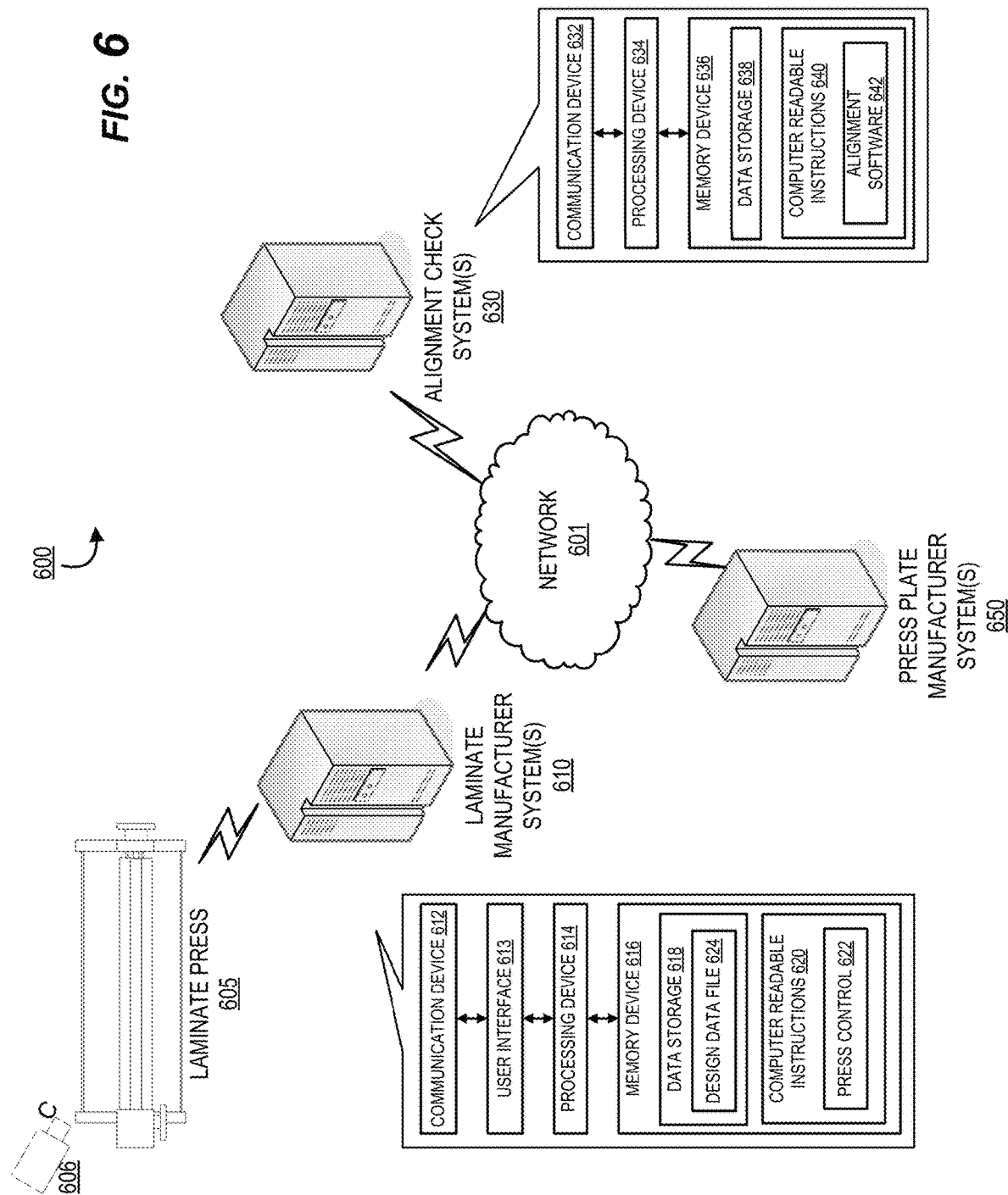

Having thus described embodiments of the invention in general terms, reference will now be made to the accompanying drawings, which are not necessarily draw to scale, and wherein:

FIG. 1 illustrates an exemplary a pressure press system for manufacture of a decorative laminate, such as one that may be used in accordance with embodiments of the present invention;

FIG. 2 provides a high level process flow illustrating a general laminate design and pressing process, in accordance with an exemplary embodiment of the present invention;

FIG. 3 provides a system environment for providing decorative and texture designs for laminate design production, in accordance with an exemplary embodiment of the present invention;

FIG. 4 illustrates using a sample laminate layer to determine how well a press plate design will align with the laminate's design, in accordance with an exemplary embodiment of the present invention;

FIG. 5 provides a high level process flow for alignment inspection of produced textured decorative laminates, in accordance with an exemplary embodiment of the present invention; and FIG. 6 provides an alignment inspection system environment, in accordance with an exemplary embodiment of the present invention.

DETAILED DESCRIPTION OF EMBODIMENTS OF THE INVENTION

In order to create a decorative laminate product with a desired overall appearance, a decorative design, defining coloration, hues, visual patterns, and the like, is combined with a texture design, defining various surface recesses and protrusions, to produce an overall desired laminate appearance. The decorative and texture designs are typically represented and combined in a merged design file as different layers such that the merged design file illustrates the overall desired appearance of the decorative laminate product. During manufacture, the goal is for a decorative laminate product to match the desired overall appearance as depicted in the merged design file. For this to occur, a decorative design applied to a laminate substrate during manufacture must be properly aligned with press plate used to apply the desired texture design. To evaluate and achieve proper registration between an applied decorative design and a press plate, an image of a decorative laminate is captured as it exits a press during manufacture. The captured image is compared to the merged design file illustrating the desired overall appearance by comparing corresponding portions from each file to one another to determine a registration quality of a current alignment of the applied decorative design to the press plate within predetermined tolerances.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Although the background section refers primarily to low pressure laminates, embodiments of the present invention may be used during the creation of press plates for low pressure laminates, high pressure laminates, and/or other laminates. Furthermore, press plates described herein may be installed in a press as "upper" press plates, "lower" press plates, and/or any other type of press plates, as will be apparent to one of ordinary skill in the art in view of this disclosure.

Referring now to the figures, FIG. 2 provides a high level process flow illustrating a general laminate design and pressing process 100, in accordance with an exemplary embodiment of the present invention. As illustrated by blocks 105 and 110, a desired overall laminate appearance comprising a decorative design component and a texture design component is created. The "decorative design" determines the general appearance of the laminate and, therefore, generally comprises an aesthetically pleasing image, arrangement of colors or hues, or the like. As described above, the decorative design may, for example, comprise an image that has the appearance of wood flooring, a tiled surface, marble, granite, concrete, brick, leather, fabric, and the like. A decorative design is typically printed and applied as a sheet to a substrate layer during a laminate manufacture process.

The "texture design" comprises the three-dimensional design of the proposed surface of the laminate. As used herein the term "texture" is generally used to refer to three-dimensional surface formations that may include various surface textures, depressions, protrusions, ridges, troughs, other embossed features, and the like. The texture design is generally configured to work with the decorative design to create a surface that closely resembles the look and/or feel of the surface or material that the laminate is intended to resemble. For example, where the decorative design comprises an image having the appearance of hardwood flooring, the texture design may comprise a plurality of depressions and/or ridges in the surface of the laminate that simulate the appearance and/or feel of wood grain and/or other features of real wood boards. In general, the texture design will ultimately be used to create a three-dimensional surface of a press plate, which will generally be the negative of the texture design. Texture design data, such as a texture design data file, is typically provided to a laminate manufacturer by a press plate manufacturer along with a produced press plate.

A press plate is typically made of a metallic material, such as stainless steel. More particularly, the press plate may be comprised of, for example, 630 or 410-grade hardened stainless steel. In general, creation of a press plate may involve first precision grinding a stainless steel plate to ensure the flatness thereof. The plate is then engraved or otherwise etched to create a three-dimensional surface based on, for example, the digital data for the three-dimensional texture design. The etching of the press plate can be accomplished by any of a variety of etching techniques that will be apparent to a person skilled in the art. For example, the etching may involve chemical etching. In some instances, etching will also require printing an image of the texture design onto the steel plate to guide the etching process. Such printing may be based on the digital data for the three-dimensional texture design. Chemical etching and other processes for etching three-dimensional patterns into metallic plates are generally well-known in the art.

The three-dimensional surface of the press plate is generally the negative of the texture design since the press plate is used to form an imprint of its three-dimensional surface into the surface of the laminate. Before the three-dimensional surface of the press plate can be created from the texture design, the growth of the press plate has to be accounted for. Since the laminating process is performed under significantly high temperatures, the press plate, typically made of a metallic material, experiences significant growth in all dimensions. If the press plate's material is known and uniformity of the press plate's material is controlled, the growth of the press plate in each dimension can usually be computed at least fairly accurately based on known material characteristics and the temperature of the laminating procedure. The texture design associated with the press plate and a decorative design are used in tandem to produce a laminate product.

FIG. 3 provides a system environment for providing decorative and texture designs for laminate design production, in accordance with an exemplary embodiment of the present invention. As illustrated in FIG. 3, the process may, in some instances, involve three parties, namely the party requiring the laminate 205, the laminate manufacturer 201, and the press plate manufacturer 210. In one embodiment, the laminate manufacturer 201 provides the decorative design to the press plate manufacturer 210 along with at least loose guidelines as to what the laminate manufacturer 201 or the party requiring the laminate 205 desires with regard to the laminate's surface texture. In this regard, the laminate manufacturer 201 may, for example, communicate a digital image of the decorative design to the press plate manufacturer 210 via a network 250. This digital image provided to the press plate manufacturer 210 is preferably the same digital image that the laminate manufacturer will print on the decorative paper used in the laminate.

Once the press plate manufacturer 210 receives the digital image of the decorative design and any texture guidelines provided by the laminate manufacture 201 and/or the party requiring the laminate 205, the press plate manufacturer 210 may then use computer software and hardware to view the digital image of the decorative design and to digitally generate a three-dimensional texture design to go along with the decorative design. For example, as illustrated in FIG. 3, the computer software 217 may permit the press plate manufacturer 210 to view the decorative design 212 on a computer monitor 215 and may have a variety of tools 217 that allows the press plate manufacturer 210 to generate and view the texture design 214 over top of the image of the decorative design 212. Once the texture design is created, the texture design may need to be checked and approved, by for example the laminate manufacturer 201 and/or the party requiring the laminate 205.

Typically, creation of the texture design requires significant experience and knowledge of not only the surface or material that the laminate will emulate, but also of human perception. For example, since the design and manufacturing constraints (such as the maximum possible embossing depth) may limit the texture design, the artist creating the texture design must know how to create a natural looking surface despite the fact that it may not be possible to exactly replicate the actual three-dimensional surface of the material or surface being emulated. Furthermore, the human mind may have expectations as to how a natural surface should look and feel that are not always accurate. The artist creating the texture design may also have numerous variables to work with, such as the depth/height of embossed features, different surface textures, the gradualness/sharpness of transitions between features, the fineness and detail of the design, and the like.

As illustrated in block 115, upon approval of the texture and decorative designs, the decorative design is positioned over a substrate material in a press. The press plate is then used to engage the decorative design on top of the substrate material to manufacture a textured decorative laminate. As will be discussed further herein, registration between the decorative design relative to the press plates can be checked and inspected for quality control, namely, for any potential design drift between the design and the plate. In one example, design drift may occur over time as a result of incremental instrument movement from repeated pressings, a build up of heat causing expansion of press plate or laminate materials, and/or other factors that may occur as a result of the manufacturing process. As illustrated in blocks 130 and 135, registration may be continually evaluated during the manufacturing process 100 based on the continued alignment inspection of block 125.

As illustrated in FIG. 4, current methods for quality control of manufactured laminates typically include producing and comparing sample laminates 305 and pattern prints 325 and/or providing additional registration material around an area of a manufactured laminate product for alignment (e.g., via alignment of crosshairs in the registration area, e.g., 315 and 329). These methods may lead to inefficient and undesirable use of production materials, as the sample laminates and registration material portions are typically cut-off and/or discarded after alignment of the design is checked. Therefore, an improved method for quality assurance of manufactured laminates is required that preferably reduces the use of excess waste materials (e.g., samples and additional registration portions) while providing an accurate comparison of the manufactured laminate to a design reference.

FIG. 5 provides a high level process flow for alignment inspection of produced textured decorative laminates 400, in accordance with one embodiment of the invention. To provide an ideal reference for quality inspection of manufactured laminates, the system described herein utilizes the actual decorative and texture design reference files for comparison of the manufactured laminates to the desired overall appearance. Decorative design data and texture design data is merged into a single data file, wherein the data file comprises the multiple layered components of a designed laminate to be produced. For example, the merged design data file may include a decorative layer, a texture layer, a substrate layer, transparent layer, a coating layer, and/or the like as separately manipulatable digital components within a file assembly, wherein each layer may be individually selected, viewed, and adjusted within the assembly. The merged design data file is used as a reference for evaluation of manufactured laminates, especially with regard to design layer alignment with press plate patterns. As illustrated in block 405, the system initially retrieves the merged design file for use in the registration process.

To inspect a manufactured laminate, a laminate production system, such as a system maintained by a laminate manufacturer, includes a camera or other imaging device that is configured to capture an image of a manufactured laminate as illustrated in block 410. In one example, an image of a manufactured laminate is captured as the manufactured laminate exits a press during a laminate manufacturing process. As illustrated in bock 415, the captured image is compared to the merged design data file to evaluate alignment of an applied decorative design layer with respect to the texture design applied by the press plate. By comparing the image of a manufactured laminate to the merged design file, potential misalignment may be detected between a current alignment of an applied decorative design with the press plate and an ideal or preferred alignment illustrated by the desired overall appearance in the design data file. In some embodiments, the system is configured to compensate for optical distortions or image deformation associated with image capture devices and lenses by applying offsets, weightings, filters, or the like to the captured images to provide accurate registration analysis.

As illustrated in block 420, the system determines a registration quality between the captured image of the manufactured laminate and the merged design data file. The system is configured to compare corresponding characteristic elements between the captured image and the design data file and analyze a quality of the registration to evaluate an alignment. A low registration quality may indicate a potential misalignment of the press plate and decorative design pattern which may require further action (e.g., correction). In one embodiment, the system is configured to compare the captured image as a whole to a corresponding merged design data file. The system may overlay the merged design data file with the captured image, wherein the system is configured to identify anomalies, mismatches, misalignments, or the like between the image and the file. In another embodiment, only a portion of the captured image is compared to the merged design data file. For example, a predetermined number of captured image segments or regions may be selected and compared to corresponding regions of the design data file.

In another embodiment, the system is configured to compare the captured image to the design data file on a pixel-by-pixel basis. The system may select an array of pixels from the captured image and compare said array to corresponding pixels of the merged design data file. In a non-limiting example, the system is configured to select a predetermined number of pixels (e.g., 15-20) from the captured image for comparison to the corresponding design data file.

In one embodiment, the system is configured to compare the captured image to the merged design data file based on color or hue variations or discrepancies between the compared image and file. In this regard, different colors and/or shades of color may indicate variations in the texture design, such as mismatched elevation changes in the three-dimensional surface (i.e., protrusions and recesses). For example, increasingly darker shades of a color may be used for increasingly deeper depressions in the proposed three-dimensional surface of the design. The system may be configured to identify a color shade mismatch between the captured image and the merged design data file indicating a misalignment of an applied decorative design and the press plate. For example, a dark shade corresponding to a depression may be positioned at a higher relative elevation of the surface than desired. In some embodiments, the system may be further configured to compare identify variations in gloss between the captured image and the merged design data file which may further indicate a misalignment.

The system is configured to identify matches and mismatches between the compared captured image and the merged design data file to determine a registration quality between an applied decorative design and a press plate. The system further determines whether an identified misalignment is outside of predetermined acceptable tolerances and requires further action, as illustrated in block 425. In one embodiment, the system calculates the registration quality based on a number of matched elements between the captured image and the merged design data file using the merged design data file as the ideal reference of the desired overall appearance. For example, the system may calculate an alignment percentage based on a number of selected pixel locations (or other compared portion) from the captured image that were matched to corresponding pixel locations from the merged data file. In some embodiments, the system may include defined or predetermined threshold values for evaluating acceptable registration quality between a captured image and the merged design data file, wherein a registration quality below a particular threshold value may trigger additional action.

In a specific embodiment, the system may sort analyzed captured images into corresponding buckets based on a determined registration quality. For example, a captured image having a registration quality between a maximum registration quality (e.g., 100%) and a first threshold value may be bucketed into a green category corresponding to acceptable registration quality. A captured image having a registration quality between the first threshold value and a lower, second threshold value may be bucketed into a yellow category corresponding to a less-than desirable, but still acceptable registration quality. Finally, a captured image having a registration quality between a minimum registration quality (e.g., 0%) and the second threshold value may be bucketed into a red category corresponding to an unacceptable registration quality requiring additional action or alignment correction. In some embodiments, identification and categorization of an image into a yellow and/or red category may automatically trigger additional actions.

If the system identifies an acceptable registration quality between a captured image and the merged design data file, the system is configured to continue manufacturing textured decorative laminates with the current alignment to the press plates illustrated in block 430. That said, as illustrated in block 435, the system is configured to trigger additional actions in response to an identified misalignment associated with a captured image. Additional actions triggered by the system include, but are not limited to, alignment correction of the press plate and/or design data file, discarding and/or flagging of a manufactured laminate associated with the captured image, heightened monitoring standards for subsequent captured images (e.g., increased number of element comparisons per image), alert generation to a user terminal or device (e.g., associated with the laminate manufacturer), or the like.

The alignment inspection process 400 of FIG. 5 may be performed within the alignment inspection system environment 600 of FIG. 6, in accordance with one embodiment of the invention. The system environment 600 of FIG. 6 comprises a laminate manufacturer system 610, an alignment check system 630, and a press plate manufacturer system 650. In some embodiments, the laminate manufacturer system 610 and the press plate manufacturer system 650 are associated with the laminate manufacturer 201 and the press plate manufacturer 210 of FIG. 3. In some embodiments, the environment 600 further includes the party requiring the laminate 205 as discussed with respect to FIG. 2. It should be understood, that within the environment 600 there may be more than one of any of the components or systems described or that one or more of components or systems may be embodied as a single device or multiple devices operating in unison. The systems and devices communicate with one another over the network 601 and perform one or more of the various steps and/or methods according to embodiments of the disclosure discussed herein. The network 601 may include a local area network (LAN), a wide area network (WAN), and/or a global area network (GAN). The network 601 may provide for wireline, wireless, or a combination of wireline and wireless communication between devices in the network. In one embodiment, the network 601 includes the Internet.

The laminate manufacturer system 610 includes the laminate press 605 which further includes a camera or imaging system 606. The laminate manufacturer system 610 with the laminate press 605 may be configured to execute one or more of the steps described in the processes herein. The laminate manufacturer system 610 further includes a communication device 612 communicably coupled with a processing device 614, which is also communicably coupled with a memory device 616. The processing device 614 is configured to control the communication device 612 such that the laminate manufacturer system 610 communicates across the network 601 with one or more other systems. The processing device 614 is also configured to access the memory device 616 in order to read the computer readable instructions 620, which in some embodiments includes a press control application 622. The press control application 622 allows for the laminate manufacturer system 610 to control the laminate press 605 as well as communicate with other systems in the environment 600 such as the alignment check system 630. The press control application 622 generally provides a user interface 613 configured to allow a user to receive information transmitted as well as input information requested by the other systems and devices of the environment 600 and communicate with and request the execution of tasks from the laminate press 605. The memory device 616 also includes a data repository 618 or storage database for storing pieces of data or files that can be accessed by the processing device 614 such as one or more design data files 624 (e.g., various laminate decorative and texture designs).

The alignment check system 630 includes a communication device 632 communicably coupled with a processing device 634, which is also communicably coupled with a memory device 636. The processing device 634 is configured to control the communication device 632 such that the alignment check system 630 communicates across the network 601 with one or more other systems. The processing device 634 is also configured to access the memory device 636 in order to read the computer readable instructions 640, which in some embodiments includes alignment software 642. In some embodiments, the alignment software 642 allows for communication with the other systems and devices within the environment 600 such as the laminate manufacturer system 610. In one embodiment the alignment software 642 is configured to execute the process steps described here for a manufactured laminate produced the laminate press 605 of the laminate manufacturer system 610. The memory device 636 also includes a data repository 638 or storage database for storing pieces of data or files that can be accessed by the processing device 634. In some embodiments, the alignment check system 630 may be part of the laminate manufacturer system 610.

As illustrated in FIG. 6, the alignment software 642 is stored on the alignment check system 630. In this embodiment, the production data, such as a captured image of a manufactured laminate and/or a design data file may be transmitted over the network 601 to the alignment check system 630 for an evaluation process as previously discussed with respect to process 400 of FIG. 5. In another embodiment, the laminate manufacturer system 610 does not transmit an entire design data file to the alignment check system 630. As the decorative design data and/or texture design data may be proprietary information, a laminate manufacturer associated with the laminate manufacturer system 610 may not wish to transmit the design data file outside of the manufacturer system 610. Instead, in one embodiment, only a portion of the design data file is transmitted to the alignment check system 630, wherein the portion is used for alignment analysis by the alignment software 642. For example, only a predetermined number of points, measurements, pixels, pixel locations, or the like associated with the proprietary design data file may be transmitted out of the laminate manufacturer system 610 thereby protecting the proprietary information and preventing unwanted reconstruction of the file by a third-party (e.g., competing manufacturer).

In another embodiment, the alignment software 642 may be installed on the laminate manufacturer system 610 instead of the alignment check system 630 as a software product or service maintained by the alignment check system 630 and an associated entity. In this way, the design data file is not required to leave the laminate manufacturer system 610 and any proprietary information is not put at risk for potential loss.

It should be appreciated that, although the written description and the figures of the present application describe the steps of an exemplary press plate design procedure in a particular order, a person having ordinary skill in the art will understand, in view of this disclosure, that, in other embodiments, the procedure may be practiced with some variations in the order of steps and that some of the steps may be combined with other steps.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. For example, by being configured to execute the steps described herein, the processor becomes a specialized device directed to alignment of press plates with respect to merged design data files.

As used herein, a "user interface," generally includes a plurality of interface devices and/or software that allow a user to input commands and/or data to direct the processing device to execute instructions or tasks. For example, the user interfaces presented in FIG. 6 may include a graphical user interface (GUI) or an interface to input computer-executable instructions that direct the processing device to carry out specific functions. The user interface employs certain input and output devices to input data received from a user or output data to a user. When a user interacts with the input and output devices, the device or system generates a signal specific to that input device to process the user interaction. These input and output devices may include a display, mouse, keyboard, button, touchpad, touch screen, microphone, speaker, LED, light, joystick, switch, buzzer, bell, and/or other user input/output device.

As used herein, a "memory device" generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication device" generally includes a modem, server, transceiver, and/or other device for communicating with other devices on a network, and/or a user interface for communicating between systems. Referring again to FIG. 6, the communication devices comprise communication interfaces having one or more devices configured to communicate with one or more other devices on a network. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with laminate manufacturing technology.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for maintaining press plate alignment, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for maintaining alignment of a press plate, the system comprising:
    a press including a press plate, the press configured for forming a laminate comprising a decorative layer and a substrate, wherein the press plate is configured for applying a texture design to the laminate, and wherein the texture design is based on a texture design drawing layer;
    a camera; and
    a processing device configured to execute computer-readable program code stored on a memory to:
        retrieve a laminate design file comprising a decorative design drawing layer and the texture design drawing layer, the laminate design file illustrating the decorative design drawing layer overlaid with the texture design drawing layer;
        following manufacture of the laminate with the press, capture an image of the laminate with the camera, wherein the captured image of the laminate comprises a portion of the texture design;
        compare a portion of the captured image of the laminate comprising the portion of the texture design to a corresponding portion of the laminate design file to determine a registration quality;
        based on the determined registration quality, determine a misalignment of the decorative layer with the press plate; and
        in response to determining the misalignment, trigger an alert.

2. The system of claim 1, wherein the processing device is configured to retrieve only the corresponding portion of the laminate design file for comparison to the captured image, wherein a remaining portion of the laminate design file is not retrieved.

3. The system of claim 1, wherein the processing device is further configured to compare a predetermined number of captured image segments from the captured image of the laminate to corresponding segments of the laminate design file.

4. The system of claim 3, wherein the predetermined number of captured image segments correspond to one or more points, measurements, pixels, or pixel locations of the laminate design file.

5. The system of claim 3, wherein the processing device is further configured to increase a number of compared image segments in response to determining the misalignment.

6. The system of claim 1, wherein the processing device is further configured to compare the captured image of the laminate to the laminate design file on a pixel-by-pixel basis.

7. The system of claim 1, wherein comparing the portion of the captured image of the laminate to the corresponding portion of the laminate design file further comprises overlaying the captured image of the laminate with the laminate design file.

8. The system of claim 7, wherein the processing device is further configured to compensate for an optical distortion associated with the captured image by applying at least one of an offset, a weighting, or a filter to the captured image.

9. The system of claim 1, wherein the decorative design drawing layer defines one or more colorations, hues, visual patterns, or images of the decorative layer.

10. The system of claim 1, wherein the texture design drawing layer defines one or more recesses and protrusions in a surface of the decorative layer.

11. The system of claim 1, wherein the registration quality is a percent match between the captured image of the laminate and the laminate design file.

12. The system of claim 11, wherein the processing device is further configured to determine the misalignment of the decorative layer with the press plate further based on the registration quality being below a minimum threshold registration quality value.

13. The system of claim 12, wherein the processing device is further configured to continue manufacturing with the press plate based on the registration quality being equal to or greater than the minimum threshold registration quality value.

14. The system of claim 12, wherein the processing device is further configured to discard the laminate based on the registration quality being below the minimum threshold registration quality value.

15. A method for maintaining alignment of a press plate, the method comprising:
providing a press including a press plate, the press configured for forming a laminate comprising a decorative layer and a substrate, wherein the press plate is configured for applying a texture design to the laminate, and wherein the texture design is based on a texture design drawing layer;
retrieving a laminate design file comprising a decorative design drawing layer and the texture design drawing layer, the laminate design file illustrating the decorative design drawing layer overlaid with the texture design drawing layer;
following manufacture of the laminate with the press, capturing an image of the laminate with a camera, wherein the captured image of the laminate comprises a portion of the texture design;
comparing a portion of the captured image of the laminate comprising the portion of the texture design to a corresponding portion of the laminate design file to determine a registration quality;
based on the determined registration quality, determining a misalignment of the decorative layer with the press plate; and
in response to determining the misalignment, triggering an alert.

16. The method of claim 15, retrieving the laminate design file further comprises retrieving only the corresponding portion of the laminate design file for comparison to the captured image, wherein a remaining portion of the laminate design file is not retrieved.

17. The method of claim 15, wherein comparing the portion of the captured image of the laminate to the corresponding portion of the laminate design file comprises comparing a predetermined number of captured image segments from the captured image of the laminate to corresponding segments of the laminate design file.

18. A computer program product for maintaining alignment of a press plate, wherein the computer program product comprises a non-transitory computer-readable medium comprising computer-readable instructions, the computer-readable instructions, when executed by a processing device, cause the processing device to:
retrieve a laminate design file associated with a laminate, the laminate design file comprising a decorative design drawing layer and a texture design drawing layer, the laminate design file illustrating the decorative design drawing layer overlaid with the texture design drawing layer;
following manufacture of the laminate with a press including a press plate, the press configured for forming the laminate, wherein the laminate comprises a decorative layer and a substrate layer, wherein the press plate is configured for applying a texture design to the laminate, and wherein the texture design is based on the texture design drawing layer, capture an image of the laminate with a camera, wherein the captured image of the laminate comprises a portion of the texture design;
compare a portion of the captured image of the laminate comprising the portion of the texture design to a corresponding portion of the laminate design file to determine a registration quality;
based on the determined registration quality, determine a misalignment of the decorative layer with the press plate; and
in response to determining the misalignment, trigger an alert.

19. The computer program product of claim 18, wherein the computer-readable instructions are further configured to cause the processing device to retrieve only the corresponding portion of the laminate design file for comparison to the captured image, wherein a remaining portion of the laminate design file is not retrieved.

20. The computer program product of claim 18, wherein the processing device is associated with a first system, and the laminate design file is stored in a second system in communication with the first system over a network, and wherein the computer-readable instructions are further configured to cause the processing device to retrieve at least the corresponding portion of the laminate design file from the second system for comparison to the portion of the captured image.

* * * * *